United States Patent [19]
Rees, deceased et al.

[11] 3,885,945
[45] May 27, 1975

[54] METHOD OF AND APPARATUS FOR ELECTRICALLY HEATING MOLTEN GLASS

[75] Inventors: Vernon Chester Rees, deceased, late of Newark, Ohio, by Bettie Jane Rees, administratrix; Magnus Laird Froberg, Granville, Ohio

[73] Assignee: Owens-Corning Fiberglas Corporation, Toledo, Ohio

[22] Filed: Mar. 20, 1974

[21] Appl. No.: 452,900

[52] U.S. Cl. ........................ 65/136; 13/6; 65/356; 65/DIG. 4
[51] Int. Cl. ............................................. C03b 5/16
[58] Field of Search ............ 65/134, 135, 136, 337, 65/356, DIG. 4; 13/6

[56] References Cited
UNITED STATES PATENTS
2,658,095  11/1953  Arbeit et al. ...................... 65/135 X
3,592,623  7/1971  Shepherd .......................... 65/136 X

*Primary Examiner*—Robert L. Lindsay, Jr.
*Attorney, Agent, or Firm*—Carl G. Staelin; John W. Overman; David H. Wilson, Jr.

[57] ABSTRACT

A furnace suitable for melting glass wherein the preponderant heat energy is derived from Joule effect heating. Batch charging of the furnace is in a region adjacent a side wall. The introduction of successive increments of batch, molten glass flow, and evolved gas flow all contribute to the advance of the floating batch as a thermal insulating blanket over a major portion of the molten glass mass to provide essentially cold top melting of the glass. The batch blanket extends toward a molten glass issuing region of the furnace. Gases evolved from the molten glass tend to rise along the forwardly inclined, batch-melt interface to a leading edge of the blanket contiguous with an exposed molten surface of glass, and to rise from the molten glass beneath that exposed surface. Heaters are localized above the exposed molten surface to maintain the surface and the walls of the bubbles forming a foam or froth thereon sufficiently fluid to pass gases to the furnace atmosphere. The heated gases above the exposed molten surface are caused to flow over the batch counter to its flow toward its leading edge to preheat its upper surface, glaze about one-half of its surface and cool the gases for release to atmosphere by locating flue ports over the batch delivery region.

11 Claims, 3 Drawing Figures

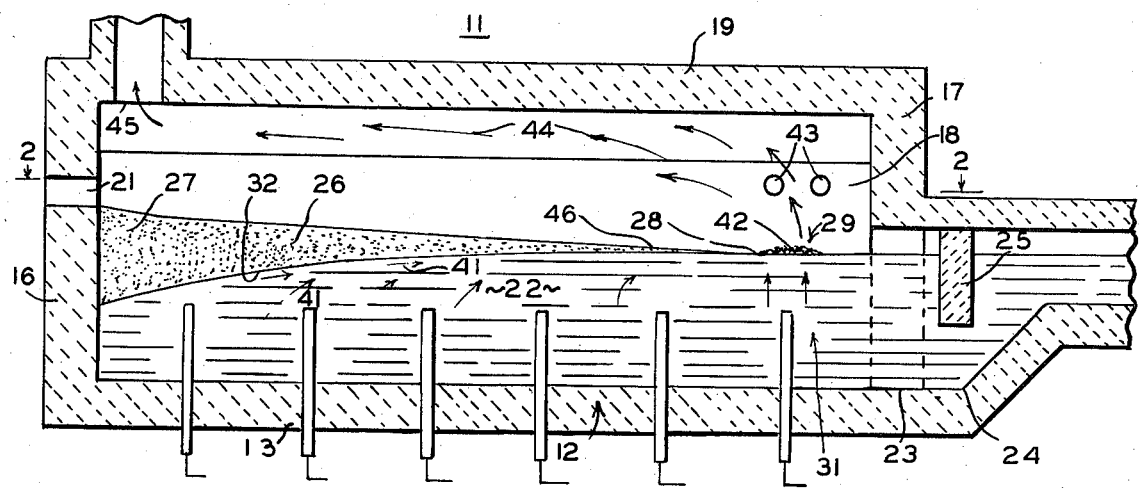
FIG. 1
FIG. 2
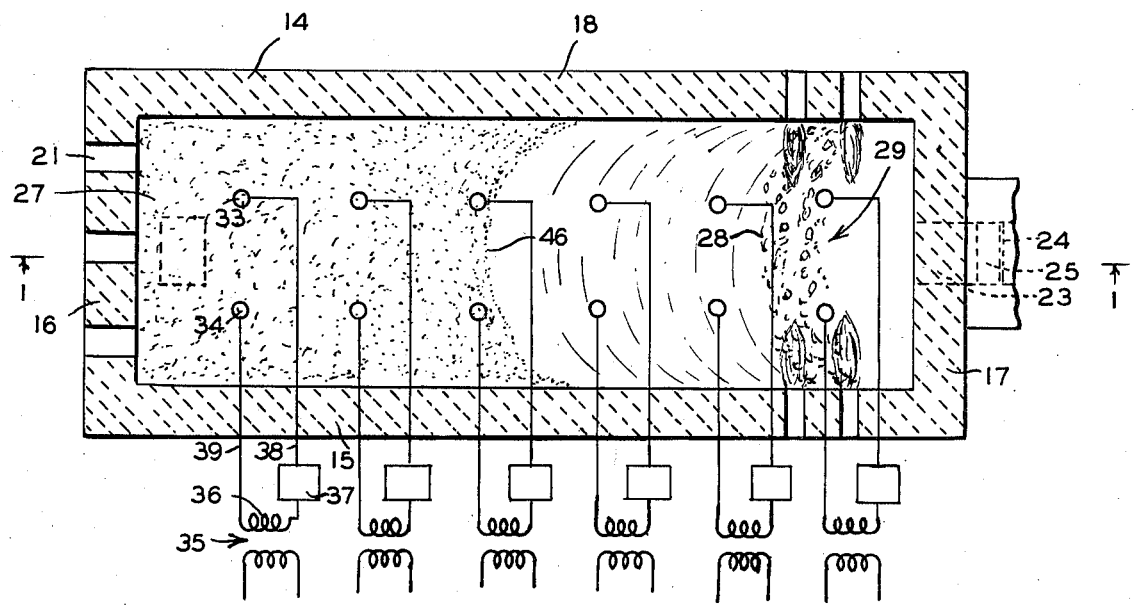

METHOD OF AND APPARATUS FOR ELECTRICALLY HEATING MOLTEN GLASS

BACKGROUND OF THE INVENTION

1. Field of the Invention

This invention relates to glass manufacturing and more particularly to an improved furnace and method of melting glass.

2. Description of the Prior Art

Glass is generally made by melting a batch of raw glass materials in a refractory lined furnace. The furnace may be heated by a hydrocarbon burner by electricity, or by a combation of a burner and electricity. A plurality of fuel burners generally are positioned to direct heat to the upper surface of the batch glass mass in hydrocarbon burning furnaces. Commonly, glass batch is delivered to one end of the melting chamber and molten glass is removed at the opposite end. The bath floats on the molten glass and the batch melts from the upper surface. In the melting and refining of the molten glass substantial quantities of gas are evolved and passed to the atmosphere of the melting chamber from which they are released to the atmosphere with the products of combustion of the hydrocarbon fuel.

Electrically heated glass furnaces similary include a melting chamber or tank for holding a batch-molten glass body. Two or more electrodes are submerged in the molten glass for heating the glass by the Joule effect when electric power is applied between the electrodes. Raw glass batch supplied to the tank floats on the surface of the molten glass and is melted into the molten glass at its inferface with the molten glass. Batch is effectively an insulator for both heat and electricity. Heat losses at the bottom and side walls tends to produce a temperature profile through the glass in the vertical plane which peaks nearer the upper surface of the melt than the bottom. Molten glass has a negative temperature coefficient of resistance hence the molten glass tends to have a lower resistance in the upper regions of the melt. Electric current magnitudes are greater in the low resistance molten glass in the upper portion of the melt causing the greatest heat to be developed in these portions. The glass is removed from the tank in a region remote from the batch, usually at a submerged throat located in side wall or the bottom of the tank.

Electric glass furnaces can be operated with a cold top. That is, batch can be distributed over the entire upper surface of the mass contained in the tank and by virtue of its thermal insulating qualities hold the heat within the molten mass. The presence of a layer of raw batch also inhibits the emission of gas from the molten glass.

Fluorine is often added to glass batch to serve as a flux to aid placing some of the batch materials in solution, to reduce bubbles in the molten glass, and to reduce the viscosity of the molten glass. Of the 1 to 2% fluorine which may be mixed with the raw batch, a large portion of the fluorine is driven from the molten glass and perhaps only 0.4 to 0.5% will remain in the glass. Boron may also be emitted from the molten glass. Emitted fluorine and boron may cause air pollution problems. In fuel burning furnaces, the emitted fluorine may also combine with hydrogen in exhaust gases to form hydrogen fluoride.

A batch blanket covering the molten glass in an electric glass furnace greatly reduce the loss of fluorine and emissionn of the detrimental gases associated with glass melting and refinement. Batch compositions can be adjusted to a much lower fluorine content since the fluorine and boron are mechanically impeded in their escape from the melt by the batch, are chemically reacted with the batch; and/or are condensed in the batch. In any event, a floating batch blanket supresses the evolution of all gases. This suppression of gas evolution has the adverse effect of retaining gas bubbles within the molten glass and results in the phenomena known as seeding unless conditioning of the glass includes further processing to permit such gases to escape.

Continuous glass furnaces combining hydrocarbon burning and electrical heating are known as typified by the disclosures of U.S. Pat. No. 2,512,761 of June 27, 1950 to Arbeit, U.S. Pat. No. 2,600,490 of June 17, 1952 to DeVoe, U.S. Pat. No. 3,097,251 of July 9, 1963 to Gell and U.S. Pat. No. 3,574,585 of Apr. 13, 1971 to Robertson et al. Such furnaces have been operated as illustrated by DeVoe with the preponderant heat energy supplied by hydrocarbon furners and the Joule effect electric heating within the molten glass has been empoloyed as an augmenting heat source. In the case of the other cited examples the furnaces have been divided by walls in the melt and baffels above the batch-melt mass. These individual sections tend to segregate melting and refining or segregate a cold top batch blanketed region from a gas fired hot top region.

An object of the present invention is to improve the process of and apparatus for continuous glass melting.

Another object is to increase the heat recovery and efficiency of heat utilization in glass melting furnaces.

A fruther object is to reduce the gas evolution from molten glass without deterimetal effects on the glass produced.

A further object is to reduce the gas evolution from molten glass without detrimental effects on the glass produced.

A fourth object is to facilitate the modification of existing hydrocarbon burning furnace facilities toward electric glass furnace facilities while realizing advantages available from both forms of application of heat energy to continuous glass melting.

Another object is to reduce the temperature of gas passed from a glass melting furnace to a flue port below that of a hydrocarbon fired furnace while achieving the advantageous releases of gases from the glass during the final portion of its passage theough the furnace. In accordance with this object many of the desirable features of cold top electric melting of glass are realized while the degassing the glass in a separate section beyond the cold top region is reduced or eliminated.

A further object is to minimize the dust developed above the batch blanket in a cold top furnace.

SUMMARY OF THE INVENTION

In accordance with the above the present invention involves a furnace construction and method of operation wherein the preponderance of the heat energy for melting and refining glass is applied by electrical Joule effect heating employing the cold top technique wherein a batch blanket is floated over a major portion of the tank. A supplemental source of heat, which may be hydrocarbon burners or electrical resistance radiant heaters, is located above the leading edge of the blanket of batch to apply sufficient heat to the upper surface to maintain that surface fluid enough to release gases from the molten glass evolved during melting and refining. Effectively, the furnace is operated as a continuous glass furnace having a modified cold top with a batch blanket leading edge near the glass issuing region and a molten surface restricted to that region.

A feature of the invention involves feeding batch at or in the region of the furnace walls and relying on the flow characteristics of the batch on a molten mass to spread a blanket across a preponderance of the molten glass in the furnace.

Another feature resides in developing a flow of glass and batch from a region in which batch is introduced toward a region from which glass is withdrawn with the electrical heat energy applied in a manner to produce a blanket or batch having its greatest thickness in the region of introduction and progressively thinning toward the region of withdrawal to a limited area of molten glass at the surface in the region of withdrawal. The batch in this manner forms an interface with the molten material which tends to cause bubbles of gas rising therein to flow toward the molten surface region of limited extent. Concentrated gas emission in this area will produce a foam or froth which tends to reduce in fluidity and seal off the gass escape. Addition of a minor amount of heat energy from above the mass and localized to this region maintains fluidity thereby militating against the tendency to develop seeds in the melt.

Efficiency of heating is achieved with respect to the heat emitted with the gas escaping from the melt and the heat from the top heaters by directing the gas above the melt across the tip of the batch blanket in a counter flow to that blanket. This is accomplished by locating the port for passing gases from the furnace in the region above that in which the batch is introduced. This counterflow tends to compensate for the thinning of the batch blanket near its radiant or leading edge since it applies sufficient heat to that portion of the blanket to partially melt it and form a crust which tends to seal against the passage of gas through the blanket and the attendant generation of dust in the furnace atmosphere. Further, the top of the blanket that portion most remote from the Joule effect heating is preheated throughout its area between the leading edge and the region of batch introduction to recover a significant amount of heat from the hot gases passed from the furnace. In this regard the heat diminishes toward the port such that a crusting effect occurs only in the region of relatively thin blanket and the thicker blanket portions nearer the region of introduction of batch remain fluid even though they are preheated.

BRIEF DESCRIPTION OF THE DRAWINGS

FIG. 1 is a schematic vertical longitudinal section of a continuous glass furnace according to this invention illustrating the batch form, and gas flow patterns experienced in such a furnace;

FIG. 2 is a schematic plan of the furnace of FIG. 1 taken along the line 2—2.

DESCRIPTION OF THE PREFFERRED EMBODIMENT

Figure 3:
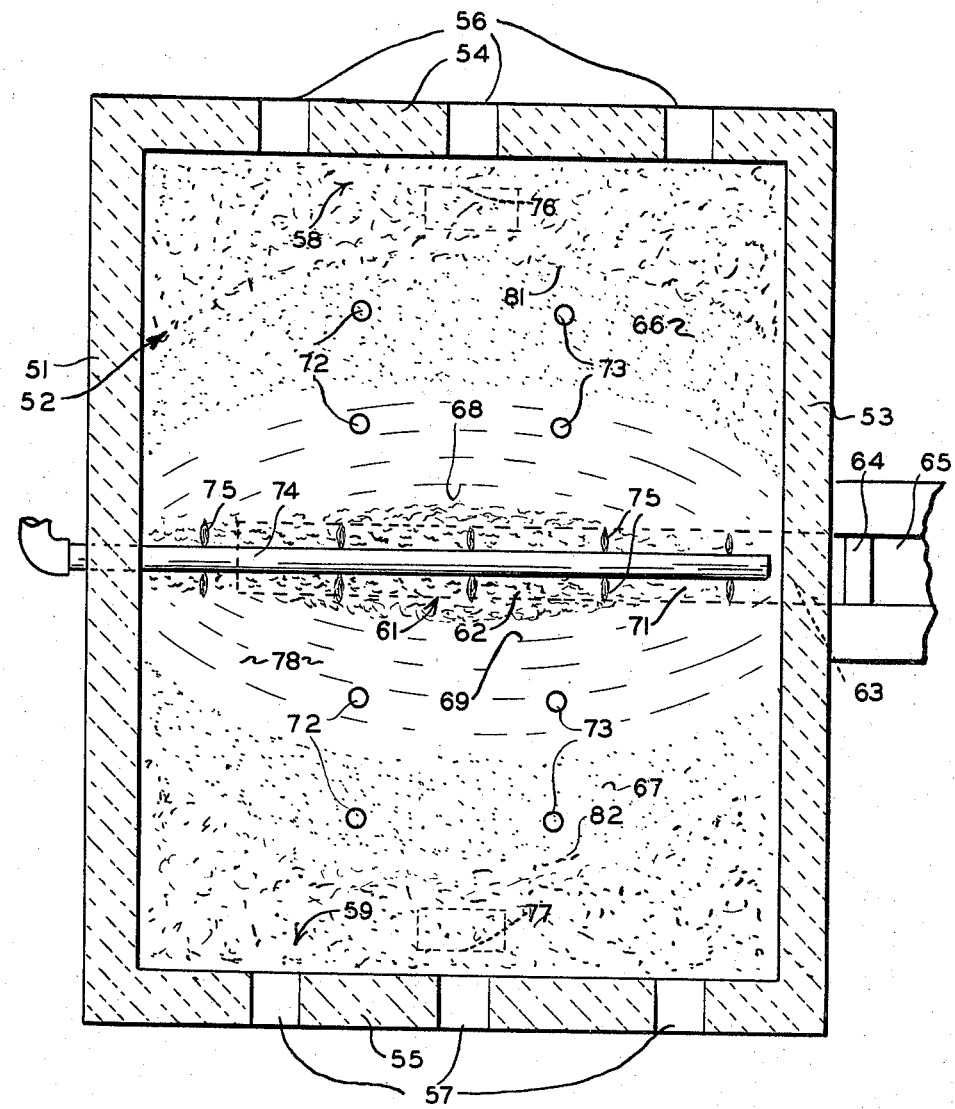
FIG. 3 is a schematic plan of another form of glass melting furnace according to this invention wherein batch is fed from opposite ends toward a middle glass issuing region.

A furnace 11 for melting glass is shown in FIGS. 1 and 2 as comprising a tank portion 12 including a bottom wall 13, side walls 14 and 15, rear end wall 16 and front end wall 17. Breast walls 18 support an arched roof 19 above tank 12 to enclose the atmosphere above the glass constituents. Batch material is introduced through ports 21 in the rear wall 16 as by screw feeders (not shown) and floats on the molten glass mass 22. Molten glass is drawnn from the tank through throat 23 in front wall 17 and passed along channel 24 to a forehearth (not shown) from which it is utilized in forming the desired product. Skimmer block 25 extends down into the molten glass flowing through throat 23 to channel 24 to prevent the passage of material on the upper surface of the molten glass mass passing into the channel.

Cool batch material is introduced into the furnace 11 as the molten glass is withdrawn to maintain an essentially constant level of glass constituents in the furnace. Batch is about two-thirds the density of molten glass. The batch therefore floats on the molten glass mass 22 as a blanket 26 which, when introduced at a batch delivery region 27, is thickest in that region and gradually tapers to a leading edge 28 at its intersection with a molten upper surface 29 in the molten glass issuing region 31 above throat 23. It is to be appreciated that batch can be introduced at other locations than shown, for example from side walls 14 and 15 near rear wall 16, it being significant that a flow of batch be from a batch delivery region 27 toward a glass issuing region 31 as induced by the advance of the batch and its build-up in the delivery region coupled with the convection and gas currents in the molten mass 22 along the inclined batch-melt interface 32.

The preponderant heating of the glass occurs within the melt 22 by the Joule effect as electrical current is passed between electrodes 33 and 34 immersed therein. Electrical power applied to transformers 35 is passed from one side of secondaries 36 through controller 37 to lead 38 and an electrode 33, then through the molten glass to an associated electrode 34 and lead 39 to the opposite side of the secondary. Typically the controller includes parallel silicon controlled rectifiers connected with opposite polarities and controlled by phase control firing circuits (not shown) which permit current to flow during a predetermined portion of each half cycle of alternating current applied to the transformers 35. Favorable power factors are realized when the firing circuits permit conduction about 95% of the half cycle in each direction.

Additions of cool batch at 27 tend to cool the melt in this region and, due to the negative temperature coefficient of the glass, tends to increase the resistance of the molten glass in this region. This reduces the power dissipated in Joule effect heating in this region for a given applied voltage between electrodes 33 and 34 from the power dissipation attainable at that voltage between electrodes nearer the molten glass delivery region 31. This batch cooling effect produces a profile of the batch-melt interface 32 having the greatest depth of batch blanket 26 in the batch delivery region and a generally exponential form with the exposed surface of the molten glass the asymptote. As the glass melts at the interface 32 convection currents tend to flow along the upwardly inclined interface toward the region 29. Further gases evolved in the melting and refining of the glass constituents from the batch into the melt also tend to flow along this upwardly inclined interface. These gas flow patterns represented by arrows 41 and the convection currents tends to advance the blanket toward the region 31.

The leading edge of the batch blanket 26 occurs about three quarters of the length of the path between the batch delivery region 27 and the molten glass issuing region 31 in a furnace of the type illustrated employing six ranks of electrodes equally spaced longitudinally of the furnace. At the leading edge the gas bubbles flowing along interface 32 as well as those evolved in the final refining occurring near the front end 17 of the tank tend to develop a froth or foam 42 on the surface. This froth 42 tends to cool and become viscous with the result that a skin develops which impedes the release of the gas in the molten glass. When such gas is constrained in the melt, it develops seeds or bubbles in the glass flowing beneath skimmer block 25. Such seeding is extremely detrimental in many glass utilizations such as in the production of continuous filament glass fibers and therefore must be avoided.

In the past substantial expense has been incurred to compound batch with constituents which avoid or suppress the evolution of bubbles in the molten glass. Further special sections have been provided, as a conditioning channel in which the molten glass is degassed as by heating to a higher temperature than the forming temperature and by maintaining a dwell of the glass at that temperature. Such special sections add to the expense of the melting and refining equipment and the expense of processing the glass.

Degassing of the molten glass within the tank 12 and furnace 11 is accomplished by maintaining the walls of the bubbles forming the froth or foam 42 sufficiently fluid to break down and release the gas to the furnace atmosphere. This is accomplihsed by applying heat to the molten glass surface 29 from above that surface. In one arrangement radiant heat is supplied above the molten glass delivery region 31 from hydrocarbon fuel burners 43 located in the breast walls 18 of the furnace. A temperature of 2000°F. is suitable to soften the walls of the bubbles sufficiently to insure effitive degassing. In the example, two burners in each side wall at the front end of the furnace provide sufficient heat to overcome heat losses tending to freeze the foam 42.

The heat of the escaping gas and of the heat boosting burners or other suitable heat sources in the molten glass issuing region of the furnace is recovered in the system illustrated by its counter flow over the batch blanket 26. Gas flow above the batch is represented by arrows 44 shown extending from the molten glass issuing region toward the batch delivery region and passing to flue port 45 above region 27. As the gas passes over the batch blanket 26 it releases its heat to the blanket thereby increasing the efficiency of the batch melting and reducing the temperature of the stack gases. In converting a furnace arranged to be gas fired and to melt the batch and heat the molten glass from the upper surface to the above described arrangement, stack gas temperatures were reduced from about 2300°F at the base of the stack to about 600°F. Further, this furnace exhibited a 97 percent reduction in undesired stack gas components when the conversion to Joule effect heating with limited radiant heating boost as described. In the exemplary conversion, the furnace originally was provided with 12 equally spaced burners along each side wall and only the two burners on each side wall nearest the front wall 17 were employed for opertion according to this invention.

The heat of the atmosphere within the furnace exhibits a rather sharp declining gradient from the leading edge 28 of the blanket 26 toward the flue port 45 such that a glaze 46 is formed on the blanket over about one-half the distance to the port. This glaze tends to suppress even the limited gas evolution through the batch heretofore experienced in cold top melting. However, this can be advantageous in that it retains constituents with the melt until they reach the molten surface in the refining zone in the molten glass issuing region 31. These constituents therefore are retained in the melt to provide their beneficial effects over a longer interval and can therefore be present in lower concentrations than in a hot top melting operation. Further the glaze tends to suppress dusting, the development of dust in the furnace atmosphere, whereby the dust removal burden for the stack gas cleaning equipment is substantially reduced.

It will be appreciated from the above that advantages of both cold top glass melting and refining and hot top glass melting and refining are realized while the disadvantages of each eliminated or substantially reduced. Thus the usual overhead traveling batch distributor of cold top electric furnace operations is not required, the dust of such operations is substantially reduced, undesired gas evolution is minimized, stack gas temperature is reduced, thermal efficiency is enhanced, and the molten glass is degassed before it issues from the tank.

A second embodiment of a furnace, which may be considered to be an electric melt glass furance having a radiant heat boost, is illustrated in FIG. 3. This furnace can be considered a double ended system since batch is fed from opposed walls and molten glass issues from a central region somewhat in the manner of two furnaces of the type shown in FIG. 1 with their front walls face-to-face. The rectangular plan of glass tank 52 is defined by long walls 51 and 53 and short walls 54 and 55. Glass batch is fed to the upper surface of the molten glass mass contained in tank 52 through three ports 56 and 57 in respective walls 54 and 55 defining longitudinal ends of the rectangle. Fixed feeders such as screws or rams (not shown) are arranged to advance the batch through ports 56 and 57 into a respective batch delivery region 58 and 59 on either side of a molten glass issuing region 61. Molten glass issuing region 61 is transverse if the tank across its longitudinal center and is in part comprised of a trough 62 extending across the longitudinal center of the floor of the tank to a throat 63 which communicates beneath a skimmer block 64 with a channel 65. Molten glass is passed by the channel 65 to a forehearth (not shown).

Batch floats on the surface of the melt with a depth profile extending from each batch deliver region 58 and 59 in a blanket 66 and 67 of gradually decreasing thickness to a leading edge 68 and 69 intersecting with the upper surface 71 of molten glass. As in the case of the furnace of FIGS. 1 and 2 the preponderant source of heat for the molten glass mass is electric power applied by suitable circuits to grouped electrodes 72 and 73 immersed in the molten glass, for example in pairs, whereby the molten glass is heated by the Joule effect as current flows between respective electrode pairs.

Gas evolved in the molten glass flows along the upward inclined contour of the batch-melt interface (not shown but of the general form of interface 32) from beneath the opposed batch blankets 66 and 67 toward the exposed molten glass surface 71. Bubbles form a froth or foam on surface 71 which tends to lose sufficient heat to increase their viscosity and retard the release of the gas and bursting of the individual bubbles. A burner manifold 74 extends across the longitudinal center of the furnace to make up the heat lost at the exposed molten glass surface, sufficient to maintain fluidity and permit the ready release of gas from the melt. Jets of flame 75 are represented as projecting from suitable apertures in the manifold 74 into the glass issuing region to apply radiant heat to surface 71.

Hot gas flow above the constituents in tank 52 is constrained by a roof (not shown in the plan section of FIG. 3) to flue ports 76 and 77 (represented in phantom) in the roof above respective batch delivery regions 58 and 59. The glass thus flow counter to the inward displacement of the batch blankets. That is they flow toward the opposed longitudinal ends 54 and 55 of the tank 52 and release their heat derived from both the molten mass of glass and the flame jets 75 to the relatively cool top of the batch blanket. Again as in the system of FIGS. 1 and 2 a glaze 78 is formed on the thinner batch blanket portions from the leading edges 68 and 69 of the blankets to a limit as at 81 and 82. These gases pass to stacks 76 and 77 at temperatures much below those experienced with top melting operations and with less dusting than experienced with unglazed cold top operation.

As in the case of the heat sources above the constituents of the system of FIGS. 1 and 2, the burner manifold 74 can be replaced by alternative heat sources including electrical resistive heaters (not shown).

In the illustrative embodiments the furnaces have been shown with heaters only in the region above the exposed molten glass. It is to be appreciated that additional heaters can be utilized to bring the furnace up to a temperature at which Joule effect heating is effective as in starting or restarting after a temporary shut down where the molten glass cools to a temperature where its resistance is too great for Joule effect heating to a suitable melting and refining temperature.

Each of the illustrated furnaces are operated by applying a preponderance of heat to the molten glass body they contain in Joule effect heating. Each has an essentially cold top type of operation wherein electrical and thermal insulting blankets of batch extend over a preponderance of the glass tank area by virtue of feeding glass batch to the surface of the molten glass mass in a batch delivery region. This feed can be from a stationary source and is fixed, ordinarily at a side wall of the furnace. Molten glass is withdrawn from the mass of molten glass in a glass issuing region having an upper surface exposed to the furnace atmosphere. This surface while substantially free of batch can be covered with a layer which impedes the escape of gas from the molten glass. A foam or froth of glass walled gas bubbles having walls cooled to a viscous state to resist rupture is typical of such a gas barrier. The exposed molten glass surface can be processed to pass gas readily by applying heat to the molten surface only in the glass issuing region. In this manner the effective cold top, Joule effect, melting can be retained over a preponderance of the glass tank surface.

Efficiency of the operation of these systems is enhanced by passing the hot gases evolved from the molten surface and the source of applied heat across the glass batch surface to preheat that surface galze a portion of that surface and cool the gases for release to external atmosphere at relatively low temperatures.

The above described apparatus aand method lend themselves to many additions, variations and alterations without departing from the spirit or scope of this invention. Accordingly, it is to be appreciated that the detailed disclosure is to be read as illustrative of the invention and not in a limiting sense.

What we claim is:

1. A continous glass melting furnace comprising:
a melting and refining tank having a batch delivery region, a glass refining region undivided from said batch delivery region and spaced across the surface of the glass constituents to be contained therein from said batch delivery region, and a molten glass issuing region in said glass refining region;
said tank having a first side wall remote from said glass issuing region and in part defining said batch delivery region, and having a second and third side walls extending from said first side wall and in part defining said batch delivery region;
a plurality of batch delivery means located in the batch delivery region for progressively feeding and distributing batch along the entire length of said first wall into said batch delivery region to advance a cover of batch extending between said second and third walls across the surface of the molten glass constituents in said tank toward said molten glass issuing region to a leading edge intersecting a free surface of exposed molten glass, the free surface of exposed batch cover covering a preponderance of the molten glass within said tank;
an array of electrodes extending into the molten glass within said tank and distributed between said batch delivery and glass issuing regions of said tank to provide the preponderance of the heat energy for melting batch materals therein;
a top on said tank extending between said batch delivery and glass issuing regions;
said furnace having a flue port in said batch delivery region above the level attained by batch, and said top defining an open gas flow path from said glass issuing region to said flue port; and
active means for applying heat energy located above the glass constituents only in the region above said glass issuing region, said means being limited in its heating capacity to apply only sufficient heat to said free surface of exposed molten glass to promote release through said free surface of exposed molten glass of gas evolved from said melted material to the atmosphere beneath said top whereby the evolved gas and atmosphere, as it flows toward said flue port, progressively releases heat energy to the upper surface of the mass of batch to preheat the upper surface of said batch and to cool the evolved gas and atmosphere substantially below the melting temperature of the batch prior to its entry into said flue port.

2. A glass melting furnace according to claim 1 wherein said means for applying heat is a hydrocarbon fuel burner.

3. A continuous glass melting furnace comprising:
a melting and refining tank which is generally rectangular in plan and has a width and a length substantially greater than said width;
said tank having first and second batch delivery regions, a glass refining region undivided from said batch delivery regions and spaced across the surface of the glass constituents to be contained therein from said batch delivery regions, and a molten glass issuing region in said glass refining region; said batch delivery regions being at each of the opposed walls defining the ends of the length of said tank;

said glass issuing region being in the vicinity of the center of the length of said tank and having a molten glass upper surface in the center of the length of the tank;

a plurality of batch delivery means located in each batch delivery region for progressively feeding and distributing batch along the entire length of the respective opposed walls defining the ends of the length of said tank into said respective batch delivery regions to advance covers of batch extending across the surface of said tank and toward said molten glass issuing region between those side walls of said tank extending from said batch delivery regions to said glass issuing region, said batch surface extending to said glass issuing region and covering a preponderance of the molten glass within said tank, said batch having a leading edge between the center of the length of the tank and each of the opposed walls defining the ends of the length of the tank;

an array of electrodes extending between said batch delivery and said glass issuing regions of said tank to provide the preponderance of the heat energy for melting batch material therein;

a top on said tank extending between said batch delivery and glass issuing regions; said furnace having first and second flue ports in said respective first, and second batch, delivery regions above the level attained by batch and said top defining an open flow path from said glass issuing region to said flue ports; and active means for applying heat energy located above the glass constituents only in the region above said glass issuing region, said means being limited in its heating capacity to apply only sufficient heat to said exposed molten glass surface to promote the escape of gas evolved from the melted material through said exposed molten glass surface to the atmosphere beneath the top, whereby the evolved gas and atmosphere as it flows toward said flue ports applies heat energy to upper surface of the mass of batch to preheat the upper surface of the mass of batch to preheat the upper surface of said batch and to cool the evolved gas and atmosphere prior to its entry into said flue port.

4. A glass melting furnace according to claim 3 herein said means for applying heat energy is located in the central region of the length of the tank.

5. A glass melting furnace according to claim 4 wherein said means for applying heat energy is a plurality of gas burners adapted to distribute heat energy across the width of the tank centrally of the length of the tank.

6. The method of continuously melting and refining molten glass comprising:
the steps of applying a preponderance of heat to a molten glass body by Joule effect heating;
feeding glass batch to the surface of the molten glass body in a batch delivery region;
distributing glass batch over a preponderance of the free surface of the combined body of molten glass and glass batch;
withdrawing molten glass from the molten glass body in a glass issuing region having a molten surface substantially free of batch and spaced substantially from said batch delivery region;
applying heat to the free surface of said combined body only in the region above the molten surface from a heating means above said surface in the glass issuing region said heat being sufficient to promote the release of gas evolved from the molten glass through the localized molten free surface; and
passing the hot gases evolved from the molten free surface and the localized heating means across the glass batch surface to progressively transfer the heat of the gases to the batch as it travels across the batch to preheat that surface and glaze a portion of that surface while cooling the evolved gases substantially below the melting temperature of the batch.

7. The method according to claim 6 wherein said molten surface in the glass issuing region is heated to about 2000°F. and said hot gases are cooled in their flow across the glass batch surface to about 600°F., and including passing said cooled gases to a flue.

8. The method according to claim 6 wherein the heat from the localized source is applied by the combustion of hydrocarbon fuel.

9. The method according to claim 6 wherein the glass batch is fed to the surface of the molten glass from a side portion of the body.

10. The method according to claim 6 wherein the glass batch is fed to the surface of the molten glass from opposed side portions of the body and the molten glass is withdrawn from a region intermediate the opposed side portions from which batch is fed.

11. The method according to claim 6 including the step of maintaining a major portion of the glass batch on the surface of the molten glass free of the glaze.

* * * * *